(12) United States Patent
Barvosa-Carter et al.

(10) Patent No.: US 7,308,738 B2
(45) Date of Patent: *Dec. 18, 2007

(54) RELEASABLE FASTENER SYSTEMS AND PROCESSES

(75) Inventors: William Barvosa-Carter, Ventura, CA (US); Alan L. Browne, Grosse Pointe, MI (US); Nancy L. Johnson, Northville, MI (US); Leslie A. Momoda, Los Angeles, CA (US); Thomas B. Stanford, Port Hueneme, CA (US)

(73) Assignee: General Motors Corporation, Detroit, MI (US)

( * ) Notice: Subject to any disclaimer, the term of this patent is extended or adjusted under 35 U.S.C. 154(b) by 710 days.

This patent is subject to a terminal disclaimer.

(21) Appl. No.: 10/337,238

(22) Filed: Jan. 6, 2003

(65) Prior Publication Data

US 2004/0117955 A1    Jun. 24, 2004

Related U.S. Application Data

(63) Continuation-in-part of application No. 10/273,691, filed on Oct. 19, 2002, now Pat. No. 7,200,902.

(51) Int. Cl.
*B23P 19/04*    (2006.01)
*A44B 21/00*    (2006.01)
(52) U.S. Cl. ............................ 24/442; 428/100; 24/446
(58) Field of Classification Search .................. 24/442, 24/446, 448, 450, 451, 452, 304; 428/100
See application file for complete search history.

(56) References Cited

U.S. PATENT DOCUMENTS 2,717,437 A * 9/1955 Mestral ...................... 428/100

2,994,117 A    8/1961 McMullin ...................... 24/201

(Continued)

FOREIGN PATENT DOCUMENTS

DE    199 56 011    6/2001

(Continued)

OTHER PUBLICATIONS

US Patent Application Publication 2002/0007884 A1, published Jan. 24, 2002.

(Continued)

*Primary Examiner*—Jack W. Lavinder

(57) ABSTRACT

A releasable fastener system comprises a loop portion and a hook portion. The loop portion includes a support and a loop material disposed on one side thereof. The hook portion generally includes a support and a plurality of closely spaced upstanding hook elements extending from one side thereof, wherein the plurality of hook elements comprises or incorporates a shape memory polymer. When the hook portion and loop portion are pressed together they interlock to form a releasable engagement. The resulting joint created by the engagement is relatively resistant to shear and pull forces and weak in peel strength forces. Introducing a thermal activation signal to the plurality of hook elements causes a change in shape orientation and/or flexural modulus that effectively reduces the shear and/or pull off forces in the releasable engagement. In this manner, disengagement of the releasable fastener system provides separation of the hook portion from the loop portion under controlled conditions. Also disclosed herein are processes for operating the releasable fastener system.

5 Claims, 3 Drawing Sheets

U.S. PATENT DOCUMENTS

| | | | |
|---|---|---|---|
| 3,101,517 A | 8/1963 | Fox et al. ................... 24/442 |
| 3,128,514 A * | 4/1964 | Parker et al. ............ 24/11 HC |
| 3,138,749 A | 6/1964 | Slibitz ..................... 318/135 |
| 3,176,364 A | 4/1965 | Dritz ....................... 24/306 |
| 3,292,019 A | 12/1966 | Hsu et al. ................ 310/328 |
| 3,365,757 A | 1/1968 | Billarant ................... 24/442 |
| 3,469,289 A * | 9/1969 | Whitacre .................. 24/450 |
| 3,490,107 A * | 1/1970 | Brumlik ................... 24/451 |
| 3,808,648 A * | 5/1974 | Billarant et al. ............ 24/450 |
| 4,169,303 A * | 10/1979 | Lemelson .................. 24/452 |
| 4,382,243 A | 5/1983 | Babitzka et al. ........... 335/219 |
| 4,391,147 A | 7/1983 | Krempl et al. ............ 73/730 |
| 4,634,636 A | 1/1987 | Yoshino et al. ............ 428/500 |
| 4,637,944 A | 1/1987 | Walker ..................... 428/35 |
| 4,642,254 A | 2/1987 | Walker ..................... 428/36 |
| 4,693,921 A | 9/1987 | Billarant et al. ........... 428/100 |
| 4,752,537 A | 6/1988 | Bhagwan .................. 428/614 |
| 4,775,310 A | 10/1988 | Fischer ..................... 425/308 |
| 4,794,028 A | 12/1988 | Fischer ..................... 428/100 |
| 4,931,344 A | 6/1990 | Ogawa et al. .............. 428/100 |
| 5,037,178 A | 8/1991 | Stoy et al. ................. 385/53 |
| 5,071,363 A | 12/1991 | Reylek et al. .............. 439/291 |
| 5,133,112 A | 7/1992 | Gomez-Acevedo ......... 24/450 |
| 5,136,201 A | 8/1992 | Culp ........................ 310/328 |
| 5,182,484 A | 1/1993 | Culp ........................ 310/328 |
| 5,191,166 A | 3/1993 | Smirlock et al. .......... 89/36.02 |
| 5,212,855 A | 5/1993 | McGanty ................... 24/442 |
| 5,284,330 A | 2/1994 | Carlson et al. ........ 267/140.14 |
| 5,312,456 A | 5/1994 | Reed et al. ................. 24/442 |
| 5,319,257 A | 6/1994 | McIntyre .................. 310/328 |
| 5,328,337 A | 7/1994 | Kunta ....................... 417/310 |
| 5,474,227 A | 12/1995 | Krengel et al. ............. 228/147 |
| 5,486,676 A | 1/1996 | Aleshin .................. 219/121.63 |
| 5,492,534 A | 2/1996 | Athayde et al. ............ 604/141 |
| 5,497,861 A | 3/1996 | Brotz ....................... 188/267 |
| 5,547,049 A | 8/1996 | Weiss et al. ................ 188/267 |
| 5,611,122 A | 3/1997 | Torigoe et al. ............. 24/442 |
| 5,656,351 A | 8/1997 | Donaruma .................. 428/100 |
| 5,657,516 A | 8/1997 | Berg et al. ................. 24/452 |
| 5,669,120 A | 9/1997 | Wessels et al. ............. 24/446 |
| 5,671,498 A | 9/1997 | Martin et al. ............. 15/244.3 |
| 5,712,524 A | 1/1998 | Suga ........................ 310/328 |
| 5,725,928 A | 3/1998 | Kenney et al. ............. 428/100 |
| 5,797,170 A | 8/1998 | Akeno ...................... 24/452 |
| 5,798,188 A | 8/1998 | Mukohyama et al. ......... 429/34 |
| 5,814,999 A | 9/1998 | Elie et al. .................. 324/662 |
| 5,816,587 A | 10/1998 | Stewart et al. .......... 280/5.516 |
| 5,817,380 A | 10/1998 | Tanaka ..................... 428/100 |
| 5,885,652 A | 3/1999 | Abbott et al. ............. 427/163.2 |
| 5,945,193 A | 8/1999 | Pollard et al. .............. 428/100 |
| 5,969,518 A | 10/1999 | Merklein et al. ........... 324/173 |
| 5,974,856 A | 11/1999 | Elie et al. .................. 73/11.04 |
| 5,979,744 A | 11/1999 | Brigleb .................... 229/87.01 |
| 5,983,467 A | 11/1999 | Duffy ....................... 24/442 |
| 6,029,783 A | 2/2000 | Wirthlin .................. 188/267.1 |
| 6,086,599 A * | 7/2000 | Lee et al. ................... 606/108 |
| 6,102,912 A | 8/2000 | Cazin et al. ................ 606/61 |
| 6,102,933 A | 8/2000 | Lee et al. ................... 606/209 |
| 6,129,970 A | 10/2000 | Kenney et al. ............. 428/100 |
| 6,148,487 A | 11/2000 | Billarant ................... 24/442 |
| 6,156,842 A | 12/2000 | Hoenig et al. .............. 525/171 |
| 6,203,717 B1 | 3/2001 | Munoz et al. ........... 252/62.52 |
| 6,257,133 B1 | 7/2001 | Anderson ............... 100/162 B |
| 6,388,043 B1 | 5/2002 | Langer et al. ................ 528/80 |
| 6,454,923 B1 | 9/2002 | Dodgson et al. ........... 204/415 |
| 6,460,230 B2 | 10/2002 | Shimamura et al. ......... 24/452 |
| 6,502,290 B1 | 1/2003 | Tseng ......................... 28/161 |
| 6,544,245 B2 * | 4/2003 | Neeb et al. ................. 24/442 |
| 6,546,602 B1 * | 4/2003 | Eipper et al. ............... 24/442 |
| 6,593,540 B1 | 7/2003 | Baker et al. ........... 219/121.63 |
| 6,598,274 B1 | 7/2003 | Marmaropoulos .......... 24/451 |
| 6,605,795 B1 | 8/2003 | Arcella et al. ......... 219/121.63 |
| 6,628,542 B2 | 9/2003 | Hayashi et al. ............. 365/158 |
| 6,681,849 B2 | 1/2004 | Goodson ................... 166/66.5 |
| 6,740,094 B2 | 5/2004 | Maitland et al. ............ 606/108 |
| 6,742,227 B2 | 6/2004 | Ulicny et al. ............... 24/442 |
| 6,766,566 B2 | 7/2004 | Cheng et al. ............... 24/452 |
| 6,797,914 B2 | 9/2004 | Speranza et al. ....... 219/121.64 |
| 6,815,873 B2 | 11/2004 | Johnson et al. ............. 310/331 |
| 2002/0076520 A1 | 6/2002 | Neeb et al. ................ 428/100 |
| 2002/0142119 A1 | 10/2002 | Seward et al. ............. 428/36.9 |
| 2003/0120300 A1 * | 6/2003 | Porter ....................... 606/191 |
| 2004/0025639 A1 | 2/2004 | Shahinpoor et al. .......... 75/722 |
| 2004/0033336 A1 * | 2/2004 | Schulte ..................... 428/100 |
| 2004/0074061 A1 | 4/2004 | Ottaviani et al. ............ 24/442 |
| 2004/0074062 A1 | 4/2004 | Stanford et al. ............. 24/442 |
| 2004/0074063 A1 | 4/2004 | Golden et al. .............. 24/442 |
| 2004/0074064 A1 | 4/2004 | Powell et al. ............... 24/442 |
| 2004/0074067 A1 | 4/2004 | Browne et al. ............. 24/442 |
| 2004/0074068 A1 | 4/2004 | Browne et al. ............. 24/442 |
| 2004/0074069 A1 | 4/2004 | Browne et al. ............. 24/442 |
| 2004/0074070 A1 | 4/2004 | Momoda et al. ............ 24/442 |
| 2004/0074071 A1 | 4/2004 | Golden et al. .............. 24/442 |

FOREIGN PATENT DOCUMENTS

| | | |
|---|---|---|
| EP | 0385443 A2 | 9/1990 |
| EP | 0673709 | 9/1995 |
| JP | 401162587 | 6/1989 |
| JP | 4-314446 | 4/1992 |
| JP | 4-266970 | 9/1992 |
| JP | 08260748 | 10/1996 |
| WO | WO 99/42528 | 8/1999 |
| WO | WO 00/62637 | 10/2000 |
| WO | WO 01/84002 | 11/2001 |
| WO | WO 02/45536 | 6/2002 |

OTHER PUBLICATIONS

US Patent Application Publication 2002/0050045 A1, published May 2, 2002.

US Patent Application Publication 2002/0062547 A1, published May 30, 2002.

\* cited by examiner

RELEASABLE FASTENER SYSTEMS AND PROCESSES

CROSS-REFERENCE TO RELATED APPLICATIONS

This application is a continuation in part application to U.S. application Ser. No. 10/273,691 filed on Oct. 19, 2002 now U.S. Pat. No. 7,200,902 which is incorporated herein in its entirety.

BACKGROUND

This disclosure relates to releasable attachment devices of the type used to fasten, retain, or latch together components of an apparatus or a structure that are to be separated or released under controlled conditions.

Hook and loop type separable fasteners are well known and are used to join two members detachably to each other. These types of fasteners generally have two components disposed on opposing member surfaces. One component typically includes a plurality of resilient hooks while the other component typically includes a plurality of loops. When the two components are pressed together they interlock to form a releasable engagement. The resulting joint created by the releasable engagement is relatively resistant to shear and pull forces, and weak in peel strength forces. As such, peeling one component from the other component can be used to separate the components with a minimal applied force. As used herein, the term "shear" refers to an action or stress resulting from applied forces that causes or tends to cause two contiguous parts of a body to slide relatively to each other in a direction parallel to their plane of contact. The term "pull force" refers to an action or stress resulting from applied forces that causes or tends to cause two contiguous parts of a body to move relatively to each other in a direction perpendicular to their plane of contact.

Shape memory polymers (SMPs) are known in the art and generally refer to a group of polymeric materials that demonstrate the ability to return to some memory polymers are capable of undergoing phase transitions in which their shape orientation is altered as a function of temperature. Generally, SMPs are co-polymers comprised of at least two different units which may be described as defining different segments within the co-polymer, each segment contributing differently to the flexural modulus properties and thermal transition temperatures of the material. Segment refers to a block, graft, or sequence of the same or similar monomer or oligomer units which are copolymerized to form a continuous crosslinked interpenetrating network of these segments. These segments may be crystalline or amorphous materials and therefore may be generally classified as a hard segment(s) or a soft segment(s), wherein the hard segment generally has a higher glass transition temperature (Tg) or melting point than the soft segment. Each segment then contributes to the overall flexural modulus properties of the shape memory polymer (SMP) and the thermal transitions thereof, the hard segments tending to increase and the soft segments tending to decrease both the flexural modulus properties and the temperatures associated with their changes. When multiple segments are used, multiple thermal transition temperatures may be observed, wherein the thermal transiton temperatures of the copolymer may be approximated as weighted averages of the thermal transiton temperatures of its comprising segments. The previously defined or permanent shape of an SMP can be set by melting or processing the polymer at a temperature higher than the highest thermal transition temperature for the shape memory polymer or its melting point, followed by cooling below that thermal transition temperature. A temporary shape can be set by heating the material to a temperature higher than any Tg or thermal transition temperature of the shape memory polymer, but lower than the highest Tg or its melting point. The temporary shape is set by applying an external stress while processing the material above the Tg, but below the highest thermal transition temperature or melting point of the shape memory material followed by cooling to fix the shape. The material can then be reverted to the permanent shape by heating the material above its Tg but below the highest thermal transition temperature or melting point. Thus, by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

BRIEF SUMMARY

Disclosed herein is a releasable fastener system that provides for a controlled release or separation of a joint in a shear and/or pull-off direction. The releasable fastener system comprises a loop portion comprising a support and a loop material disposed on a surface thereon; a hook portion comprising a support and a plurality of hook elements disposed on a surface thereon, wherein the plurality of hook elements comprises a shape memory polymer; and a thermal activation device coupled to the plurality of hook elements, the thermal activation device being operable to selectively provide a thermal activation signal to the plurality of hook elements and change a shape orientation and/or flexural modulus thereof to reduce a shear force and/or a pull-off force of an engaged hook and loop portion. The plurality of hook elements may optionally comprise a conductive element embedded within the shape memory polymer.

In another embodiment, a releasable fastener system comprises a first hook portion comprising a first support and a plurality of first hook elements disposed on a surface thereon, wherein the plurality of first hook elements comprises a shape memory polymer; a second hook portion comprising a second support and a plurality of second hook elements disposed on a surface thereon, wherein the second hook elements comprise a shape similar to the first hook elements; and a thermal activation device coupled to the plurality of first hook elements, the thermal activation device being operable to selectively provide a thermal activation signal to the plurality of first hook elements and change a shape orientation and/or flexural modulus thereof to reduce a shear force and/or a pull-off force of an engaged first hook and second hook portion. The plurality of first hook elements may optionally comprise a conductive element embedded within the shape memory polymer.

In another embodiment, a releasable fastener system comprises a cavity portion comprising a support and a plurality of cavities disposed within the support; a hook portion comprising a support and a plurality of hook elements disposed on a surface thereon, wherein the plurality of hook elements comprises a shape memory polymer and, in an unpowered state, comprises shapes complementary to the plurality of cavities; and a thermal activation device coupled to the plurality of hook elements, the thermal activation device being operable to selectively provide a thermal activation signal to the plurality of hook elements and change a shape orientation and/or flexural modulus thereof to reduce a shear force and/or a pull-off force of an engaged hook and cavity portion. The plurality of hook elements may optionally comprise a conductive element embedded within the shape memory polymer.

In another embodiment, a releasable fastener system comprises a loop portion comprising a support and a loop material disposed on a surface thereon; a hook portion comprising a support and a plurality of hook elements disposed on a surface thereon, wherein the plurality of hook elements comprises a shape memory polymer and optionally a conductive element; and means for changing the shape orientation, the flexural modulus property, or the combination thereof of the plurality of hook elements to reduce a shear force and/or a pull-off force of an engaged hook and loop portion.

In yet another embodiment, a releasable fastener system comprises a loop portion comprising a support and a loop material disposed on a surface thereon; a hook portion comprising a support and a plurality of hook elements disposed on a surface thereon, wherein the plurality of hook elements comprises a conductive element and a shape memory polymer; and means for changing a temperature of the plurality of hook elements and the loop material upon demand to reduce a shear force and/or a pull-off force of an engaged hook and loop portion.

A hook portion for a releasable fastener system is disclosed, comprising a support and a plurality of hook elements attached to the support, wherein the plurality of hook elements comprises a shape memory polymer and optionally a conductive element, adapted to change a shape orientation, a flexural modulus property, or a combination thereof, upon receipt of a thermal activation signal.

A process for operating a releasable fastener system comprises contacting a loop portion with a hook portion to form a releasable engagement, wherein the loop portion comprises a support and a loop material disposed on a surface thereon, and wherein the hook portion comprises a support and a plurality of hook elements disposed on a surface, wherein the plurality of hook elements comprises a shape memory polymer; maintaining constant shear and pull-off forces in the releasable engagement without introducing a thermal activation signal; selectively introducing the thermal activation signal to the plurality of hook elements, wherein the energy signal is effective to change a shape orientation, a flexural modulus property, or a combination thereof to the plurality of hook elements; and reducing the shear and/or pull off forces in the releasable engagement.

A process for operating a releasable fastener system comprises contacting a loop portion with a hook portion to form a releasable engagement, wherein the loop portion comprises a support and a loop material disposed on a surface thereon, and wherein the hook portion comprises a support and a plurality of hook elements disposed on a surface, wherein the plurality of hook elements comprises a shape memory polymer and optionally a conductive element; maintaining constant shear and pull-off forces in the releasable engagement without introducing a thermal activation signal; selectively introducing the thermal activation signal to the plurality of hook elements, wherein the energy signal is effective to change a shape orientation, a flexural modulus property, or a combination thereof to the plurality of hook elements; and reducing the shear and/or pull off forces in the releasable engagement.

The above-described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
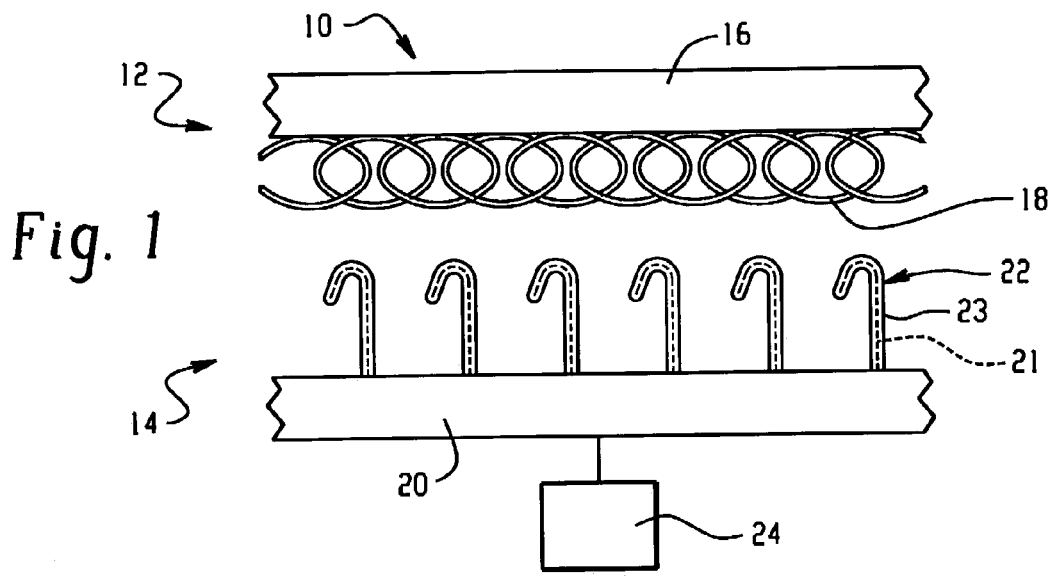
FIG. 1 is a cross sectional view of a releasable fastening system of a first embodiment.

As shown in FIG. 1, a releasable fastener system, generally indicated as 10, comprises a loop portion 12 and a hook portion 14. The loop portion 12 includes a support 16 and a loop material 18 disposed on one side thereof whereas the hook portion 14 includes a support 20 and a plurality of closely spaced upstanding hook elements 22 extending from one side thereof. The hook elements 22 generally consist of a shape memory polymer formed appropriately to engage with the corresponding loops. Optionally, the hook elements 22 may comprise a conductive element or fiber 21 coated or encased in a shape memory polymer 23. Alternately the conductive element 21 may consist of a thermoplastic polymer, which may be thermally or electrically conductive.

The shape memory polymer provides the hook elements 22 with a shape and/or flexural modulus changing capability, as will be described in greater detail. Coupled to and in operative communication with the hook elements 22 is an activation device 24. The activation device 24, on demand, provides a thermal activation signal to the hook elements 22 to cause a change in the shape orientation and/or flexural modulus of hook elements 22. The change in flexural modulus generally persists only during the applied thermal activation signal. However the change in shape orientation generally remains after the duration of the applied thermal activation signal. The illustrated releasable fastener system 10 is exemplary only and is not intended to be limited to any particular shape, size, configuration, number or shape of hook elements 22, shape of loop material 18, or the like. Moreover, the orientation of each hook element may be randomly arranged on the support or may be aligned in the same direction (as shown in FIG. 1).

Figure 2:
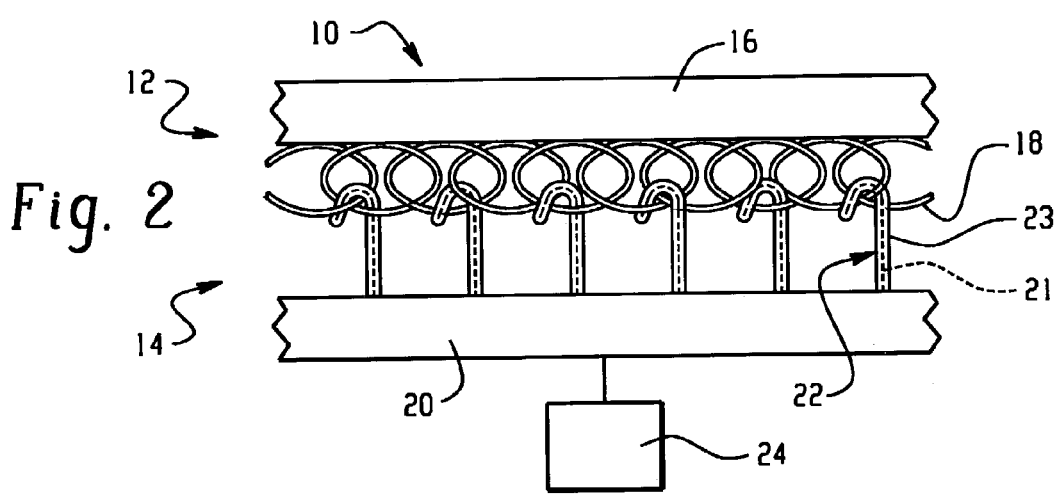
FIG. 2 is a cross sectional view of a releasable fastening system of the first embodiment in a locked position.

During engagement, the two portions 12, 14 are pressed together to create a joint that is relatively strong in shear and/or pull-off directions, and weak in a peel direction. For example, as shown in FIG. 2, when the two portions 12, 14 are pressed into face-to-face engagement, the hook elements 22 become engaged with the loop material 18 and the close spacing of the hook elements 22 resist substantial lateral movement when subjected to shearing forces in the plane of engagement. Similarly, when the engaged joint is subjected to a force substantially perpendicular to this plane, (i.e., pull-off forces), the hook elements 22 resist substantial separation of the two portions 12, 14. However, when the hook elements 22 are subjected to a peeling force, the hook elements 22 can become more readily disengaged from the loop material 18, thereby separating the hook portion 12 from the loop portion 14. It should be noted that separating the two portions 12, 14 using the peeling force is generally facilitated if one or both of the supports forming the loop portion 12 and hook portion 14 are flexible.

Figure 3:
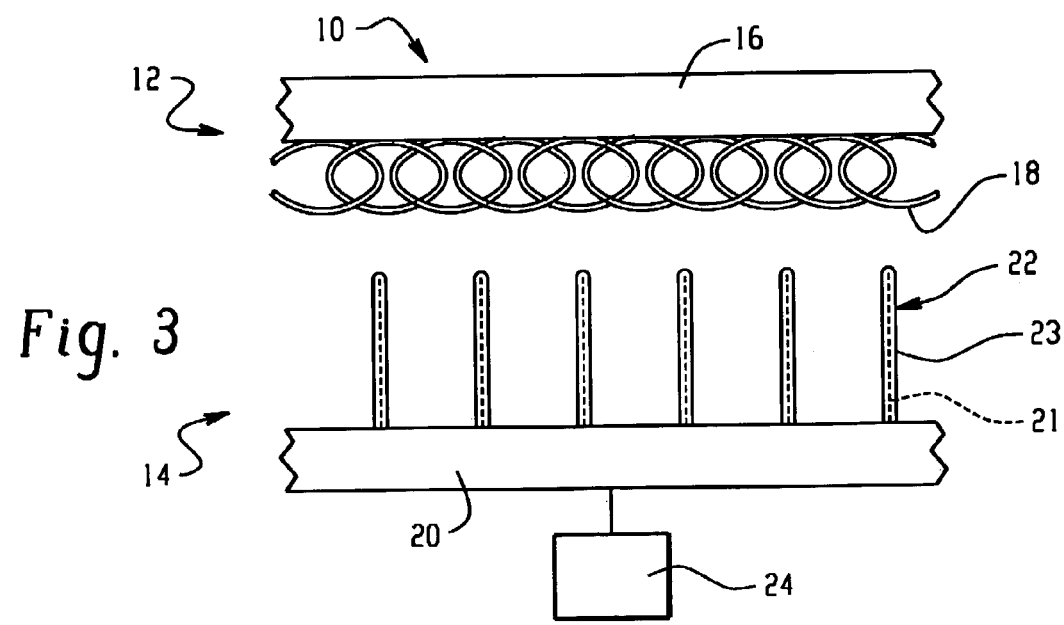
FIG. 3 is a cross sectional view of a releasable fastening system of the first embodiment in an unlocked position.

To reduce the shear and pull-off forces resulting from the engagement, the shape orientation and/or flexural modulus of the hook elements 22 are altered upon receipt of the thermal activation signal from the activation device 24 to provide a remote releasing mechanism of the engaged joint. That is, the change in shape orientation and/or flexural modulus of the hook elements reduces the shearing forces in the plane of engagement, and/or reduces the pull off forces perpendicular to the plane of engagement. However, depending on the hook geometry and direction of shear, the reduction in pull off forces is generally expected to be greater than the reduction in shear forces. For example, as shown in FIGS. 2 and 3, the plurality of hook elements can have inverted J-shaped orientations. Upon receiving the thermal activation signal from the activation device 24, a change occurs in the flexural modulus properties of the hook elements 22, providing the joint with marked reductions in shear and/or pull-off forces. Upon demand, a change to substantially straightened shape orientations occurs to the plurality of hook elements, due to the external force applied under the load of engagement, resulting in disengagement of the two portions 12 and 14.

The hook elements 22 may be formed integrally with support 20 or may be attached directly to the support 20. For example, an adhesive can be applied to the support 20 and the hook elements 22 can be mechanically pressed into the adhesive. Suitable support materials include, but are not intended to be limited to, metals, plastics, or fabrics. If the activation device is located in a position remote from the hook elements, conductive paths are preferably provided to feed heat and/or electricity to the hook elements 22. The conductive paths are thermally and/or electrically conductive materials linking the activation device 24 to the hook elements 22.

Preferably, the conductive element 21 and the SMP 23 are chosen to provide flexibility to the hook elements 22 for those applications requiring a change in shape orientation and/or flexural modulus. It should be noted that any number of conductive elements 21 might be used in the hook elements 22 as long as the shape change and/or flexural modulus change properties of the hook elements 22 are not compromised. The conductive element 21 preferably consists of a material and of dimensions such that upon activation (thereby producing a reduction in the shear and pull off force of an engaged hook), it does not restrict or impede the change in shape and/or flexural modulus properties of the hook elements 22, and/or the subsequent shape recovery thereof. The shape memory polymer 23 coated or encased onto the conductive element 21 is preferably designed such that the flexural modulus properties of the shape memory polymer 23 dominate and therefore determine the flexural modulus properties of the hook element 22. For similar reasons, the conductive element 21 preferably has suitable flexural modulus properties for permitting the desired shape memory effect. The design of the conductive element 22 may consist of a single strand conformed to the desired hook shape or a loop similarly shaped. Although the cross-sectional shape of the hook elements 22 depicted in the Figures is preferably circular, other shapes are suitable such as, for example, hook elements 22 having a cross-sectional shape of an oval, a cross, a square, a rectangle, and the like. As such, the hook elements 22 in the figures are not intended to be limited to any particular cross sectional shape.

In practice, the spacing between adjacent hook elements 22 is in an amount effective to provide the hook portion 14 with sufficient shear and/or pull off resistance desired for the particular application during engagement with the loop portion. Depending on the desired application, the amount of shear and/or pull-off force required for effective engagement can vary significantly. Generally, the closer the spacing and the greater amount of the hook elements 22 employed will result in increased shear and/or pull off forces upon engagement. The hook elements 22 preferably have a shape configured to become engaged with the loop material upon pressing contact of the loop portion with the hook portion, and vice versa. As such, the hook elements 22 are not intended to be limited to any particular shape. In the engaged mode, the hook elements 22 can have an inverted J-shaped orientation, a mushroom shape, a knob shape, a multi-tined anchor, T-shape, spirals, or any other form of a hook-like element used for separable hook and loop fasteners. Such elements are referred to herein as "hook-like", "hook-type", or "hook" elements whether or not they are in the shape of a hook. Likewise, the loop material may comprise a plurality of loops or pile, a shape complementary to the hook element (e.g., a key and lock type engagement), or any other form of a loop-like element used for separable hook and loop fasteners.

The arrays of hook elements 22 of various geometries and/or loop material 18 on the respective supports 16, 20 are to be so arranged and sufficiently dense such that the action of pressing the two portions 12, 14, together results in the mechanical engagement of the hook elements 22 with the loop material 18 creating a joint that is strong in shear and pull-off forces, and relatively weak in peel. Remote disengagement of the two portions 12, 14 is effected by raising the temperature of the shape memory polymer 23 above its transition temperature (but below the highest thermal transition temperature or melting point), causing the hook elements 22 to revert to the permanent shape (a substantially straightened shape as shown in FIG. 3). In this manner, changing the shape orientation and/or flexural modulus of the hook elements 22 can be used to provide on-demand remote engagement and disengagement of joints/attachments.

The loop material 18 generally comprises a random looped pattern or pile of a material. The loop material is often referred by such terms as the "soft", the "fuzzy", the "pile", the "female", or the "carpet". Suitable loop materials are commercially available under the trademark VELCRO from the Velcro Industries B.V. Materials suitable for manufacturing the loop material include thermoplastics such as polypropylene, polyethylene, polyamide, polyester, polystyrene, polyvinyl chloride, acetal, acrylic, polycarbonate, polyphenylene oxide, polysulfone, and the like, and thermoset materials such as various epoxies, and phenol-formaldehyde, polyester, silicone, and polyurethane resins, and the like. The loop supports 16 can comprise metal loop material with the ability to conduct heat to the hook portion when the two portions are engaged. The loop material may be integrated with the support 16 or may be attached to the support 16.

Alternatively, the loop material 18 can be fabricated from the same shape changing and/or flexural modulus changing materials employed for the hook elements 22 as previously discussed. As such, instead of being passive, the loop material 18 fabricated from SMPs can be made active upon receipt of a thermal activation signal.

The supports 16, 20 for the various loop 12 and hook portions 14 may be rigid or flexible depending upon the intended application. Suitable materials for fabricating the supports include plastics, fabrics, metals, and the like. For example, suitable plastics include thermoplastics such as for example polypropylene, polyethylene, polyamide, polyester, polystyrene, polyvinyl chloride, acetal, acrylic, polycarbonate, polyphenylene oxide, polysulfone, and other like thermoplastic polymers. Additionally, thermoset materials such as various epoxies, and phenol-formaldehyde, polyester, silicone, and polyurethane resins, and the like may be used. An adhesive may be applied to the backside surface of the support (the surface free from the hook elements 22 or loop material 18) for application of the releasable fastener system 10 to an apparatus or structure. Alternatively, the releasable fastener system 10 may be secured to an apparatus or structure by bolts, by welding, or any other mechanical securement means. It should be noted that, unlike traditional hook and loop fasteners, both supports could be fabricated from a rigid or inflexible material in view of the remote releasing capability provided. Traditional hook and loop fasteners typically require at least one support to be flexible so that a peeling force can be applied for separation of the hook and loop fastener.

The shape memory polymer 23 can be activated by any suitable means, e.g., a thermal activation signal, preferably a means for subjecting the material to a temperature change above a first transition temperature. The "first transition temperature" is defined herein as the transition temperature of shape memory polymer or the lowest transition temperature of a composite shape memory material. The "last transition temperature" is defined as the highest transition temperature of the SMP or the highest transition temperature of a composite SMP material. For example, for elevated temperatures, heat may be supplied using hot gas (e.g. air), steam, induction, or electrical current. The activation means may, for example, be in the form of a heated room or enclosure, or an iron for supplying heat, a hot air blower or jet, means for passing an electric current through, or inducing an electrical current in (e.g. by magnetic or microwave interaction), the shape memory polymer (or through or in an element in thermal contact therewith). The activation device 24 can be of any form, shape, or size effective to provide an activation signal effective to provide a shape change and/or flexural modulus change to the hook elements. Also, the activation device 24 may be in any location relative to the fastening system to provide the shape and/or flexural modulus change of the SMP structure. In a preferred embodiment, the hook elements 22 are activated by conductance heating of the conductive element 21 in contact with the shape memory polymer 23. For example, the support 20 can comprise a resistance type heating block to provide a thermal energy signal which is transmitted by conductance to the conductive element 21, sufficient to cause a shape change and/or flexural modulus change to the hook elements 22. The resistance heater may be attached to the hook support either on the hook face or opposite side to the hook face. Alternately, the conductive element 21 consists of a loop of electrically conductive material which is in appropriate electrical contact with the resistance heater, such that it may be heated directly by resistance heating.

The hook elements 22 comprising a SMP 23 are alternated between one of at least two shape orientations such that at least one orientation will provide a reduction relative to the other orientation(s) in a shear force and/or a pull-off force of an engaged hook and loop portion, when an appropriate thermal signal is provided. A given shape orientation is set by molding or shaping the SMP at or above a transition temperature. To set a permanent shape of the hook elements 22, the shape memory polymer must be at about or above its melting point or highest transition temperature (also termed "last" transition temperature). The SMP hook elements are shaped at this temperature by molding or shaped with an applied force followed by cooling to set the permanent shape. The temperature necessary to set the permanent shape is generally between about 40° C. to about 300° C. Setting a temporary shape of the SMP hook elements requires the SMP material to be brought to a temperature at or above its Tg or lowest thermal transition temperature, but below the melting point or highest transition temperature of the SMP. At or above the Tg or lowest transition temperature (also termed "first transition temperature"), a temporary shape of the SMP hook elements is set by applying an external force, followed by cooling of the SMP to lock in the temporary shape. The temporary shape is maintained as long as the hook elements remain below the lowest or first transition temperature. The permanent shape is regained when the applied force is removed and the SMP hook elements are again brought to or above the highest or last transition temperature of the SMP. The temporary shape can be reset by repeating the heating, shaping and cooling steps. The Tg of the SMP can be chosen for a particular application by modifying the structure and composition of the polymer. Transition temperatures of SMPs range from about −63° C. to above about 160° C.

Shape memory polymers 23 may contain more than two transition temperatures. For example, the SMP composition 23 may comprise a composite of two or more different shape memory polymers, each with different Tg's resulting in a material with two or more transition temperatures: the lowest transition temperature representing the first transition temperature, and a distinct transition temperature for each constituent SMP. The presence of multiple SMPs in a composite SMP material allows for the definition of multiple temporary and permanent shapes and permits the SMP composition to exhibit multiple transitions between temporary and permanent shapes.

In a preferred embodiment, the permanent shape of the hook elements 22 is a substantially straightened shape and the temporary shape of the hook elements 22 is an inverted J-shape (see FIGS. 1-3). In another preferred embodiment, the shape memory polymer comprises a permanent shape and multiple temporary shapes.

In another preferred embodiment, the permanent shape of the hook elements 22 is an inverted J-shape and the temporary shape of the hook elements 22 is a substantially straightened shape. In this embodiment, a change in flexural modulus properties while under the load of engagement, results in a shape change to substantially straightened shape. After disengagement, the permanent shape is now recovered by application of the thermal stimulus signal.

The temperature needed for permanent shape recovery can be set at any temperature between about −63° C. and about 160° C. or above. Engineering the composition and structure of the polymer itself can allow for the choice of a particular temperature for a desired application. A preferred temperature for shape recovery is greater than or equal to about −30° C., more preferably greater than or equal to about 20° C., and most preferably a temperature greater than or equal to about 50° C. Also, a preferred temperature for shape recovery is less than or equal to about 250° C., more preferably less than or equal to about 200° C., and most preferably less than or equal to about 180° C.

Shape memory polymers can be thermoplastics, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly (ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly (ethylene terephthalate), polyethylene/nylon (graft copolymer), polycaprolactones-polyamide (block copolymer), poly (caprolactone) dimethacrylate-n-butyl acrylate, poly (norbornyl-polyhedral oligomeric silsequioxane), polyvinylchloride, urethane/butadiene copolymers, polyurethane block copolymers, styrene-butadiene-styrene block copolymers, and the like.

Suitable conductive elements 21 for the hook elements 22 are conductive elements that are of a thickness or gauge chosen to provide flexibility to the hook elements for those applications requiring a change in shape orientation and/or flexural modulus. In one embodiment, the conductive element is in the form of a conductive wire. The wires can be fabricated from any thermally or electrically conductive material such as metal, metal coated wires, graphite, carbon, and the like. The conductive element 21 is preferably disposed substantially throughout the length of the hook. The conductive element may be encased in the SMP or fixedly attached to the outside of the SMP hook element. Alternatively, the conductive element 21 may be in the form of fine particles dispersed uniformly throughout the SMP. The conductive element 21 increases the heat dissipation through the length of the hook element 22 by transmitting heat from the activation device 24 through the element. Alternatively, when the conductive wire 22 is in the form of a loop, resistance heating through the wire 22 can be used to heat the shape memory polymer 23. The diameter of the wire is preferably greater than or equal to about 0.001 inch, more preferably greater than or equal to about 0.005 inch, and especially preferred greater than or equal to about 0.010 inch. Also, the diameter of the wire is preferably less than or equal to about 0.100 inch, more preferably less than or equal to about 0.050 inch, and especially preferred less than or equal to about 0.020 inch.

The SMP 23 preferably coats, encases, or surrounds the length of the conductive element 21. Any known methods to introduce a wire in a polymer matrix can be used, such as during extrusion of the polymer. The hook elements 22 may also be produced by injection molding, machining, cutting, or tooling a suitable SMP substrate. A preferred method of producing the hook elements is by solvent coating onto a conductive element wire. Solvent coating is preferably a spraying or multiple dipping process. The conductive element 21 is formed into a hook-like shape and is sprayed with or dipped into organic solutions of the SMP. The solvent coating process results in a uniform layer of polymer coating the conductive element. Any suitable thickness of SMP coating the conductive element may be used as long as the shape changing and/or flexural modulus properties are not compromised. In one embodiment, the coating on a conductive wire preferably has a thickness of up to about 0.25 millimeters. The conductive element is preferably treated with a coating agent to promote adherence of the SMP to the surface of the conductive element. Suitable coating agents include polyvinyl chloride, silicone, and the like. The organic solutions used in the solvent coating process must be compatible with the SMP, but not dissolve the coating agent.

In another embodiment, the conductive element may be a thermally conductive polymer or ceramic, such as conductive epoxies, and conductive polymers such as polyaniline, polypyrrole, and polythiophene, and their derivatives.

In another embodiment the conductive element 21 comprises fillers dispersed uniformly within the SMP, and more particularly fillers possessing high thermal and/or electrical conductivity properties. By incorporating conductive fillers in the SMP there is an increased rate of shape change and/or flexural modulus change since the thermally and/or electrically conductive material is in contact with a large surface area of the SMP thereby facilitating heat transfer. Suitable fillers include particles, powders, flakes, or fibers of metals, metal oxides, metal alloys, and/or conductive carbon as well as glass, ceramic, or graphite fibers coated with metal or metal alloys. Suitable fibrous fillers include fibers fabricated from copper, silver, aluminum, nickel, carbon, graphite, magnesium, chromium, tin, iron, titanium, and mixtures comprising at least one of the foregoing metals. Also suitable are fibers fabricated from alloys of iron, such as stainless steel; nickel alloys; and copper alloys. Metal-coated fibers having cores of varying materials are also useful. Suitable core materials for the metal-coated fiber include vitreous mineral such as glass, silicates of aluminum, silicates of magnesium, silicates of calcium, and the like; and inorganic carbon materials such as graphite, carbon fibers, mica, and the like. Suitable particulate materials include powders or particles of carbon, iron, aluminum, copper, magnesium, chromium, tin, nickel, silver, iron, titanium, stainless steel, and mixtures comprising at least one of the foregoing.

A suitable amount of filler can be greater than or equal to about 0.1 weight percent, preferably greater than or equal to about 1 weight percent based on the total weight of the shape memory polymer. Also preferred is a filler amount of less than or equal to about 25 weight percent, more preferably less than or equal to about 20 weight percent, and most preferably less than or equal to about 10 weight percent based on the total weight of the shape memory polymer. The filler is preferably uniformly distributed in the polymer matrix.

Figure 4:
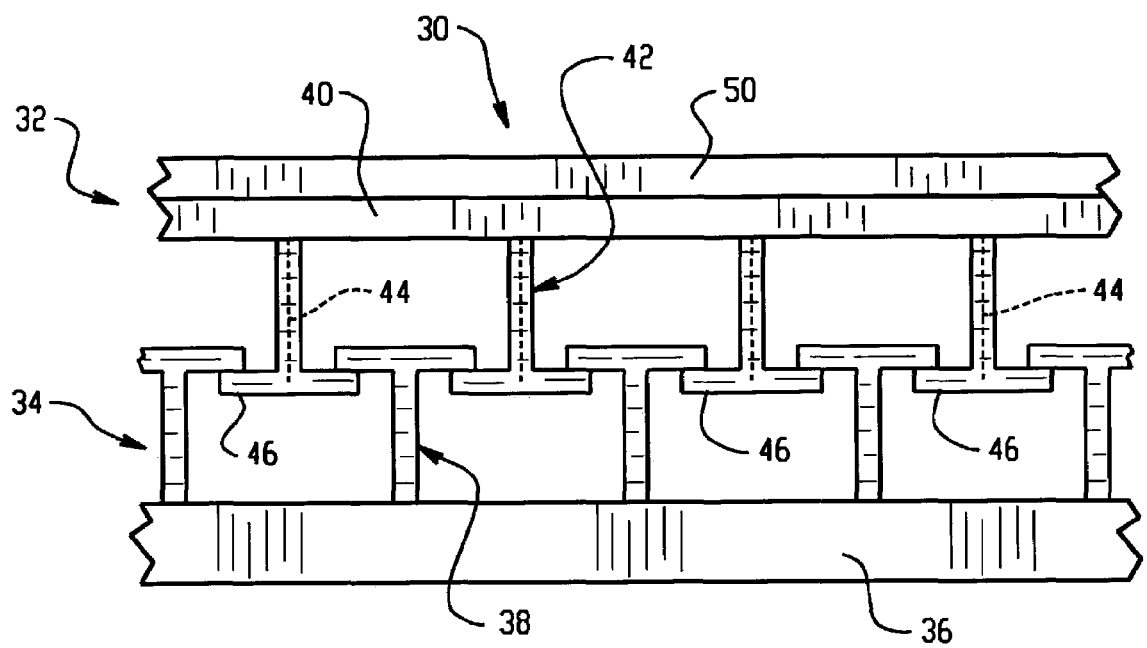
FIG. 4 is a cross sectional view of a releasable fastening system of a second embodiment in a locked position.

In a second embodiment, a releasable fastener system, generally indicated as 30, comprises two hook portions 32 and 34, as shown in FIG. 4. A first support 40 comprises a plurality of closely spaced upstanding first hook elements 42 on one side thereon. The first hook elements 42 comprise a conductive element 44 and a SMP material 46. Preferably, the first hook elements have a T-shape as shown. The lateral extensions of the T-shape are preferably aligned in a single direction. In this embodiment, the temporary shape of the first hook elements 42 is the "T" shape and the permanent shape of hook elements 42 is a substantially straightened or collapsed "Y" shape. A second support 36 comprises a plurality of closely spaced upstanding second hook elements 38, which can be pressed into a face-to-face mechanical engagement creating a joint that is strong in shear and pull-off forces, and relatively weak in peel. The second hook elements 38 may comprise any suitable material including a shape memory polymer and conductive element. As shown, the second hook elements preferably have a similar shape to the first hook elements and a staggered configuration. The lateral extensions of the T-shape of the second hook elements are aligned in the same direction as the first hook elements and interlock upon face-to-face mechanical engagement with the first hook elements.

The shape memory polymer 46 provides the first hook elements 42 with a shape changing and/or flexural modulus capability. Coupled to and in operative communication with the first hook elements 42 is an activation device 50. The activation device 50, on demand, provides a thermal activation signal to the hook elements 42 to cause a change in the shape orientation and/or flexural modulus of the hook elements 42. The illustrated releasable fastener system 30 is exemplary only.

Figure 5:
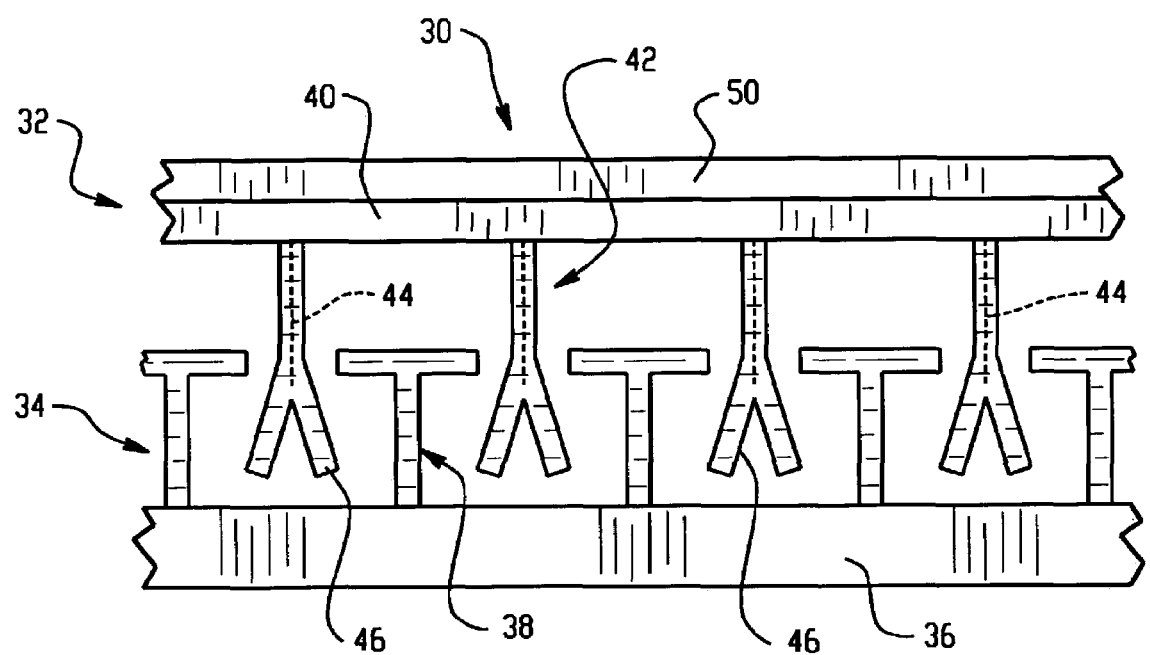
FIG. 5 is a cross sectional view of a releasable fastening system of the second embodiment in an unlocked position.

To reduce the shear and pull-off forces resulting from the engagement of first support 40 and second support 36, the shape orientation and/or flexural modulus of first hook elements 42 are altered upon receipt of the thermal activation signal from the activation device 50 to provide a remote releasing mechanism of the engaged joint. For example, as shown in FIGS. 4 and 5, the plurality of first and second hook elements has a T-shaped orientation wherein the shape of the first hook elements 42 change, upon demand, to a substantially folded or collapsed Y-shape upon receiving the thermal activation signal from the activation device 50. The substantially folded or collapsed Y-shape relative to the T-shaped orientation provides the joint with marked reductions in shear and/or pull-off forces.

In another preferred embodiment, the permanent shape of the hook elements 22 is a T-shape. In this embodiment, a change in flexural modulus properties while under the load of engagement, results in a shape change to a folded or collapsed Y-shape. The thermal stimulus results in disengagement of the fastener system. After disengagement, the permanent T-shape is now recovered by application of the thermal stimulus signal in the absence of a load.

In a preferred embodiment the second hook elements 38 are fabricated from a metal or conductive material that can selectively be heated on demand to provide a shape change and/or flexural modulus change in the first hook elements 42. In another embodiment, both first hook elements 42 and second hook elements 38 comprise a conductive element and SMP material.

Figure 6:
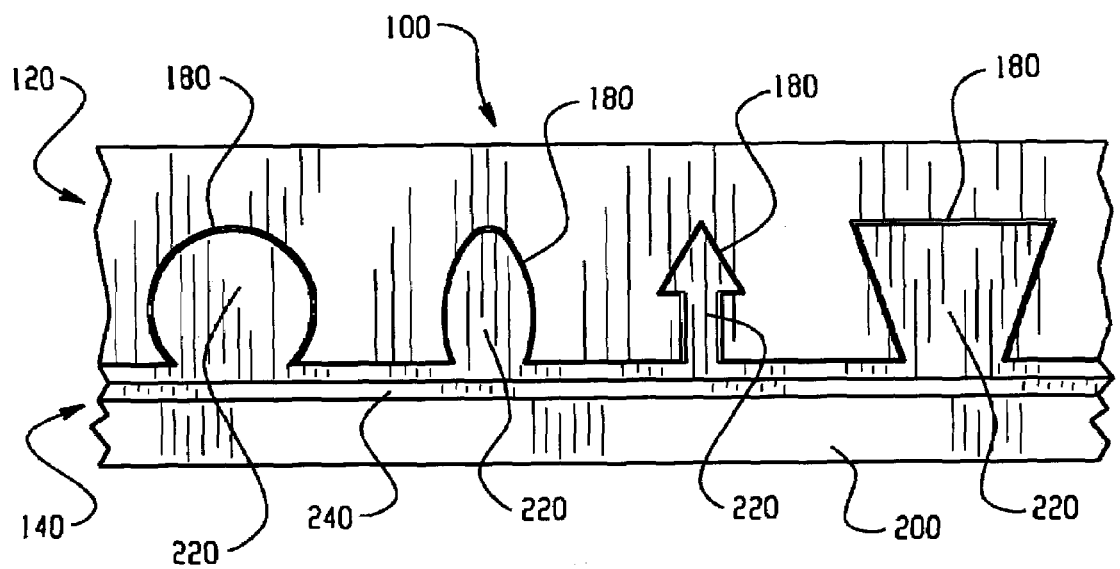
FIG. 6 is a cross sectional view of a releasable fastening system of a third embodiment in a locked position.

In a third embodiment, a releasable fastener system of FIG. 6, generally indicated as 100, comprises a cavity portion 120 and a hook portion 140. The cavity portion 120 includes a plurality of fixed cavity elements 180 on one side thereof, whereas the hook portion 140 includes a support 200 and a plurality of closely spaced, upstanding, flexible, hook elements 220 extending from one side thereof. The hook elements 220 comprise a shape memory polymer.

The shape memory polymer provides the hook elements 220 with a shape changing and/or flexural modulus capability. Coupled to and in operative communication with the cavity portion 120 is an activation device 240. The activation device 240, on demand, provides a thermal activation signal to the hook elements 220 to cause a change in the shape orientation and/or flexural modulus of the hook elements 220. The illustrated releasable fastener system 100 is exemplary only and is not intended to be limited to any particular shape, size, configuration, number or shape of hook elements 220, shape or number of cavity elements 180, location or type of activation device, or the like.

During engagement, the two portions 120, 140 are pressed together to create a joint that is relatively strong in shear and/or pull-off directions, and weak in a peel direction. For example, as shown in FIG. 6, when the two portions 120, 140 are pressed into face-to-face engagement, the hook elements 220 become engaged with or "snap" into the cavity elements 180 providing an engaged joint.

Figure 7:
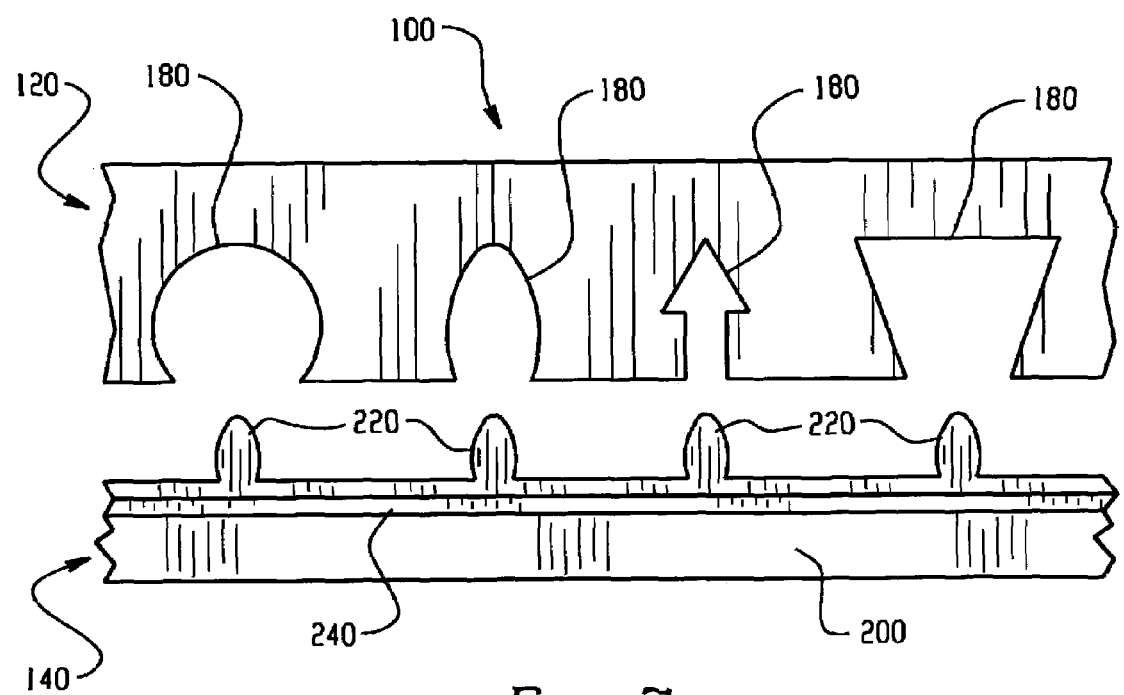
FIG. 7 is a cross sectional view of a releasable fastening system of the third embodiment in an unlocked position.

To reduce the shear and pull-off forces resulting from the engagement, the shape orientation and/or flexural modulus of the hook elements 220 are altered upon receipt of a thermal activation signal from the activation device 240 to provide a remote releasing mechanism of the engaged joint. For example, as shown in FIGS. 6 and 7, the plurality of hook elements have a knob shaped geometry that is changed, upon demand, to substantially straightened or elliptical orientations upon receiving the thermal activation signal from the activation device 240. The substantially straightened or elliptical orientation relative to the knob-shaped orientation provides the joint with marked reductions in shear and/or pull-off forces.

The hooks for the hook and cavity embodiment can be fabricated from materials as outlined previously for the hook and loop embodiment. The hook elements may be fabricated from SMP alone, SMP with an embedded conductive element, or SMP and conductive filler. The heating source (described previously) can be coupled to the hook portion, the cavity portion, or directly to the hook elements themselves. The cavity portion can be fabricated from metals, polymers, or polymer composites.

In a preferred embodiment, the array of appropriately shaped, regularly spaced cavity elements of the cavity portion 120 is matched with a substantially similar regularly spaced array of hook elements of the hook portion 140.

It will be appreciated that any number of different products or structural elements can be disassembled using this technique. It is not necessary to know and physically locate the exact position of each fastener of a product. Instead, it is simply necessary to know the transition temperature of the shape memory polymer utilized within the products, to enable the material to be "activated".

Reference to "first" and "second" are only identifiers and are not intended to illustrate a position, sequence, order, etc.

The disclosure is further illustrated by the following non-limiting example.

EXAMPLE

In this Example, a hook portion was fabricated from a shape memory polymer by solvent coating. A series of copper wire hooks were formed as protrusions from a copper metal surface. The hooks were formed from 2-3 millimeter long by 0.01-inch diameter wire. The wire hooks were pretreated with a thin film of polyvinyl chloride or silicone. The polyurethane shape memory polymer MM5520 from Mitsubishi Heavy Industries having the general structure [R'—O—C(O)—NH—R—NH—C(O)—O—]$_n$ wherein R and R' are varied to provide differences in physical properties such as hardness, tensile strength, modulus, transition temperature, Tg, and specific gravity, was dissolved in dimethyl formamide or dioxane to form a 10-30 percent solution. The hooks were coated with the polyurethane through a multiple spraying or dipping process. The coated hooks were dried at about 80° to about 100° C. after each solution spray or dip. Polymer films of up to about 0.25 millimeters can be produced by this method. The metal surface was then equipped with a thin film resistance heater.

While the invention has been described with reference to one exemplary embodiment, it will be understood by those skilled in the art that various changes may be made and equivalents may be substituted for elements thereof without departing from the scope of the invention. In addition, many modifications may be made to adapt a particular situation or material to the teachings of the disclosure without departing from essential scope of the invention. Therefore, it is intended that the invention not be limited to the particular embodiment disclosed as the best mode contemplated for carrying out this invention, but that the invention will include all embodiments falling within the scope of the appended claims.

The invention claimed is:

1. A releasable fastener system comprising:
   a cavity portion comprising a support and a plurality of cavities disposed within the support;
   a hook portion comprising a support and a plurality of hook elements disposed on a surface thereon, wherein the plurality of hook elements comprises a shape memory polymer and, in an unpowered state, comprises shapes complementary to the plurality of cavities; and
   a thermal activation device coupled to the plurality of hook elements, the thermal activation device being operable to selectively provide a thermal activation signal to the plurality of hook elements and change a shape orientation and/or flexural modulus thereof to reduce a shear force and/or a pull-off force of an engaged hook and cavity portion.

2. The releasable fastener system of claim 1, wherein the shape memory polymer comprises polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate), polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, or copolymers thereof.

3. The releasable fastener system of claim 1, wherein the thermal activation signal comprises heating the shape memory polymer above a first transition temperature to effectuate a change in the shape orientation and/or flexural modulus of the plurality of hook elements.

4. The releasable fastener system of claim 1, wherein the shape memory polymer further comprises a conductive element.

5. The releasable fastener system of claim 1, wherein the shape memory polymer further comprises conductive filler.

* * * * *